United States Patent
Hindle et al.

(10) Patent No.: US 9,347,337 B2
(45) Date of Patent: May 24, 2016

(54) GAS TURBINE ENGINE MOUNTING ARRANGEMENTS

(71) Applicant: ROLLS-ROYCE PLC, London (GB)

(72) Inventors: Andrew Kenneth Hindle, Derby (GB); Benjamin Thomas Littley, Derby (GB); Alana Johnson, Derby (GB); Keith Adam Lambert, Perthshire (GB)

(73) Assignee: ROLLS-ROYCE plc, London (GB)

( * ) Notice: Subject to any disclaimer, the term of this patent is extended or adjusted under 35 U.S.C. 154(b) by 874 days.

(21) Appl. No.: 13/644,849

(22) Filed: Oct. 4, 2012

(65) Prior Publication Data

US 2013/0084170 A1 Apr. 4, 2013

(30) Foreign Application Priority Data

Oct. 4, 2011 (GB) .................................. 1117028.9

(51) Int. Cl.
| | |
|---|---|
| *F01D 25/28* | (2006.01) |
| *F01D 25/02* | (2006.01) |
| *F02C 7/047* | (2006.01) |
| *F02C 7/20* | (2006.01) |

(52) U.S. Cl.
CPC ................ *F01D 25/28* (2013.01); *F01D 25/02* (2013.01); *F02C 7/047* (2013.01); *F02C 7/20* (2013.01); *Y02T 50/672* (2013.01)

(58) Field of Classification Search
CPC ......... F01D 25/28; F01D 25/02; F02C 7/047; F02C 7/20; Y02T 50/672
USPC ........... 415/126; 244/134, 134 B; 248/62, 65, 248/70, 74.1, 74.2, 74.3
See application file for complete search history.

(56) References Cited

U.S. PATENT DOCUMENTS

| | | | | |
|---|---|---|---|---|
| 1,332,796 | A | * | 3/1920 | Franklin .................... F16L 3/11 248/60 |
| 3,216,685 | A | * | 11/1965 | Raymond ............... F16B 2/245 248/316.7 |
| 3,913,187 | A | | 10/1975 | Okuda |
| 4,153,228 | A | * | 5/1979 | Delserro ................. F16L 3/123 24/19 |
| 4,312,487 | A | * | 1/1982 | Kimura .................. F16L 3/1236 206/338 |
| 4,566,660 | A | * | 1/1986 | Anscher ..................... F16L 3/13 24/453 |
| 4,591,119 | A | * | 5/1986 | Kraus ........................ F16L 3/13 248/316.7 |
| 4,856,739 | A | * | 8/1989 | Takikawa ................ F16L 3/085 248/316.1 |

(Continued)

FOREIGN PATENT DOCUMENTS

| | | |
|---|---|---|
| EP | 0 376 371 A2 | 7/1990 |
| FR | 2 909 153 A1 | 5/2008 |

OTHER PUBLICATIONS

Jan. 30, 2012 British Search Report issued in Patent Application No. GB1117028.9.

*Primary Examiner* — Igor Kershteyn
*Assistant Examiner* — Aaron R Eastman
(74) *Attorney, Agent, or Firm* — Oliff PLC (57) ABSTRACT

A clamp suitable for use in an anti-icing system of a gas turbine engine is provided is disclosed. The clamp has a clasping portion for clasping a heating element. Two resilient arms extend from the clasping portion to a substantially rigid outer collar. Translational movement of the clasping portion, which may be created by radial expansion of an annular heating element being clasped thereby, can be accommodated by the clamp by elastic deformation of the resilient arms. This allows radial expansion of the heating element to be accommodated without relative rotation between the clasping portion and the heating element.

16 Claims, 6 Drawing Sheets

(56) References Cited

U.S. PATENT DOCUMENTS

| | | | | |
|---|---|---|---|---|
| 5,458,303 A | * | 10/1995 | Ruckwardt | F16L 3/237 248/68.1 |
| 5,535,970 A | * | 7/1996 | Gobbi | F16L 3/13 24/557 |
| 6,079,670 A | * | 6/2000 | Porte | B64D 15/04 165/170 |
| 6,592,078 B2 | * | 7/2003 | Porte | B64D 15/04 244/134 B |
| 7,802,762 B2 | * | 9/2010 | Bauer | B60R 16/0215 24/555 |
| 2009/0152401 A1 | * | 6/2009 | Sternberger | B64D 33/02 244/134 B |

* cited by examiner

GAS TURBINE ENGINE MOUNTING ARRANGEMENTS

CROSS-REFERENCE TO RELATED APPLICATIONS

This application is based upon and claims the benefit of priority from British Patent Application Number 1117028.9 filed 4 Oct. 2011, the entire contents of which are incorporated by reference.

BACKGROUND OF THE INVENTION

1. Field of the Invention

The present invention is concerned with mounting arrangements. The invention is concerned with, for example, mounting arrangements for use in heating assemblies, such as anti-icing assemblies, of gas turbine engines.

During use of a gas turbine engine, for example a gas turbine engine mounted on the wing of an aircraft, ice may form on various parts of the engine. For example, ice may form on surfaces of the engine intake, such as towards the leading surfaces of the nacelle. The ice may form in a variety of conditions, for example during flight through clouds containing supercooled water droplets and/or on the ground in freezing fog.

Ice attached to the surface of the gas turbine engine may effectively change the geometry of the surface to which it is attached, such that oncoming flow is presented with a surface that is not to design specification. For example, ice formation may reduce the size of the engine air intake below design specification. This may ultimately result in lower engine efficiency and/or performance. A further problem may be caused by ice that has formed on the engine surface breaking free in an uncontrolled manner. This could lead to ice being ingested into the engine, which could lead to damage and/or further loss of efficiency.

It is therefore desirable to provide an anti-icing system that controls, for example by substantially eliminating, ice formation on the engine surfaces. Arrangements of anti-icing systems comprise tubes that are supplied with hot air. The tubes contain holes through which the hot air can escape. Through these holes, the hot air can be provided to surfaces that are susceptible to ice formation. An example of such an anti-icing arrangement is an annular tube provided inside the leading edge of the nacelle (or engine intake). Such an annular tube may be provided with heated air, which may be from the compressor, which may then be directed as required to the leading edge surfaces of the nacelle through the holes formed therein. Such an arrangement acts to heat the leading edge surfaces of the nacelle, thereby preventing/reducing ice formation.

It is necessary to fix the annular tube in the desired position, which in the case of the example above may be inside the leading edge of the nacelle. However, during operation of the anti-icing system, the annular tube may change shape. In particular, the annular tube may radially expand (with respect to the engine axis). This may be due to thermal expansion resulting from being supplied with hot air and/or expansion due to pressure of the air supplied to the ring, which may, for example, be from the exit of the compressor. As such, the mounting arrangement used to attach the annular tube to the engine must be able to accommodate such radial expansion.

2. Description of the Related Art

Figure 1:
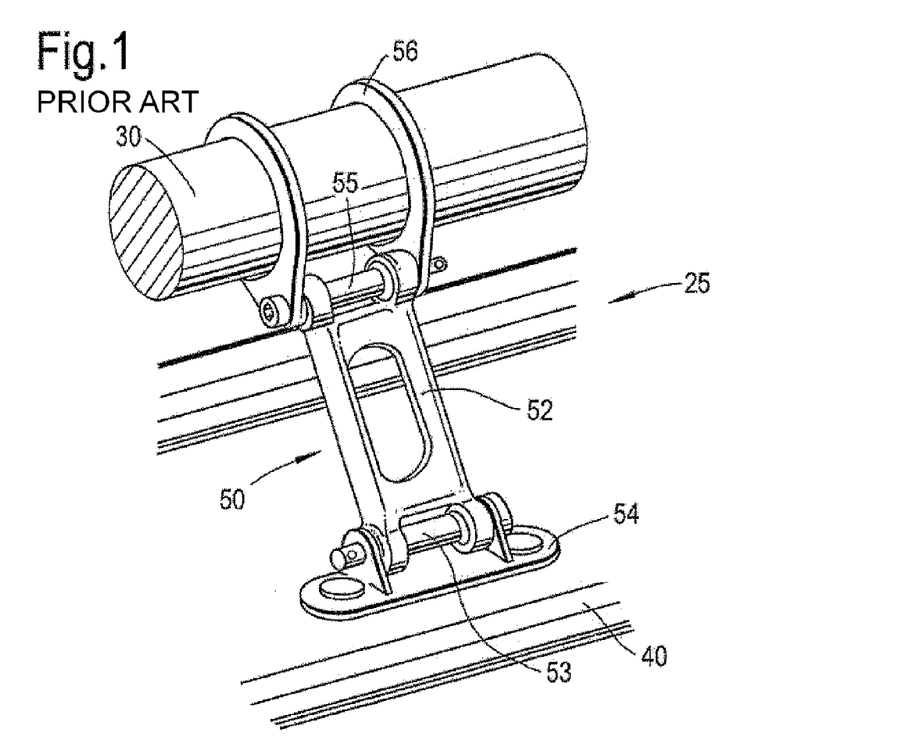
FIG. 1 is a schematic showing an example of an anti-icing arrangement having a heating element held in a mounting bracket.
Figure 2:
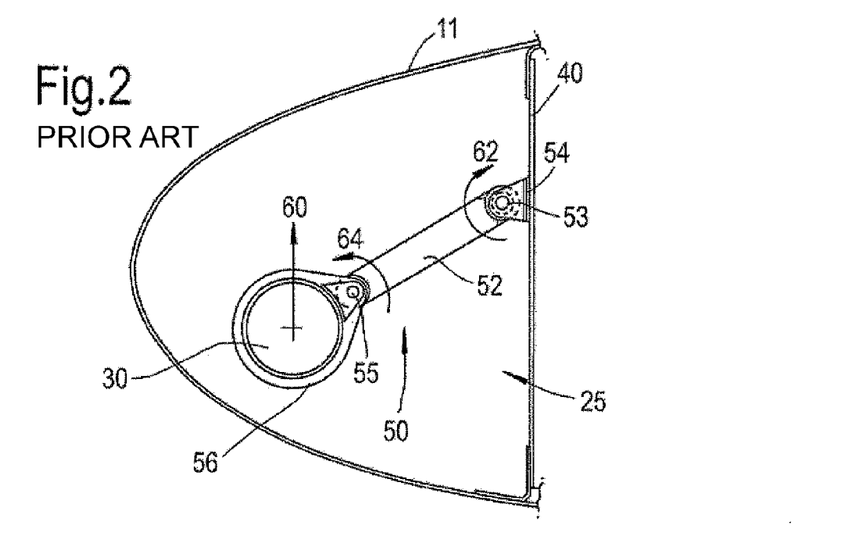
FIG. 2 is a cross-sectional side-view showing the anti-icing arrangement of FIG. 1 mounted within a nacelle of a gas turbine engine.

An example of a known anti-icing arrangement 25 is shown in FIGS. 1 and 2. The anti-icing arrangement 25 is located inside a nacelle 11, and comprises a heating pipe 30 attached to a bulkhead 40 of the engine using mounting brackets 50. Each mounting bracket 50 has an arm 52 that is rotatably mounted at one end to a fixing 54 on the bulkhead 40. The arm 52 is rotatably mounted at its other end to a bangle 56. The bangle 56 is fixed, for example welded, to the heating pipe 30. This in itself can lead to residual stresses and/or distortion in the heating pipe 30 and/or the mounting bracket 50. Any distortion may lead to misalignment and/or further stresses during assembly of the full anti-icing arrangement.

Typically, the heating pipe 30 is annular. As mentioned above, in use, the annular heating pipe 30 may experience radial expansion relative to the engine axis, as indicated by the arrow 60 in FIG. 2. In order to accommodate this radial expansion 60, the rotatable joint 53 between the arm 52 and the fixing 54 pivots, as does the rotatable joint 55 between the arm 52 and the bangle 56. In FIG. 2, arrow 62 represents the rotation of the arm 52 about the joint 53, and arrow 64 represents rotation of the bangle 56 about the joint 55 in response to radial expansion 60 of the annular heating pipe 30.

The arrangement shown in FIGS. 1 and 2 therefore requires joints 53, 55 that allow the arm 52 to pivot relative to both the fixing 54 and the bangle 56. These joints 53, 55 therefore require bearings, bushes, and/or sleeves to allow for the pivoting. These bearings/bushes/sleeves may fail, for example seize. This may be caused by repeated radial expansion/contraction of the heating pipe 30. The problem may be exacerbated by temperature fluctuations that may be caused by the heat provided to the anti-icing system, and/or by the presence of any contaminants. If the bearings/bushes/sleeves fail/seize, any radial expansion of the heating pipe 30 cannot be accommodated by the mounting bracket 50 through rotation of the joints 53, 55. This may induce stress in the heating pipe 30 and/or the mounting bracket 50, which may lead to failure of the heating pipe 30 and/or the mounting bracket 50. Thus, the FIGS. 1 and 2 arrangement may be considered to be heavy and relatively complicated, and/or susceptible to failure.

OBJECTS AND SUMMARY OF THE INVENTION

According to an aspect of the present invention, there is provided a clamp for holding an elongate element having a central axis. The clamp comprises an outer collar having a fixing portion for fixing the clamp to a fixed structure. The clamp comprises a clasp for holding the elongate element. The clasp comprises a clasping portion arranged to receive the elongate element (or at least a portion thereof). The clasping portion has a clasping axis. When the elongate element is received, the clasping axis of the clasping portion is generally aligned with the local central axis of the elongate element. The clasp comprises a first resilient arm extending from a first suspension position of the clasping portion to the outer collar. The clasp comprises a second resilient arm extending from a second suspension position of the clasping portion to the outer collar. Accordingly, translational movement of the clasping portion in a plane normal to the clasping axis may be accommodated by flexing of the first resilient arm and the second resilient arm.

There may be substantially no rotation of the clasping portion about the clasping axis as a result of the translational movement.

Such an arrangement allows translational movement of the elongate element that is being held to be accommodated by the clamp without any need for rotating parts, such as bearings, sleeves or bushes. This may mean that no rotating parts are required. For example, no rotating parts may be required in order to ensure that there is no relative rotation between the clasping portion and the elongate element, which may result in undesirable wear.

The first and second resilient arms may be elastically deformable and/or flexible, such that they can reversibly flex, or bend, under load. Such load may be translational load generated, for example, by translational movement of an elongate element being received by the clasping portion. Some embodiments may have more than two resilient arms, for example 3, 4, 5 or more than 5 such resilient arms. Movement of the clasp (including the clasping portion and the first and second arms) may be within the outer collar. The clamp, and in particular the clasp, may be said to be configured for suspending an element, such as an elongate element. Translational movement may mean movement in a plane that is perpendicular to the (local) longitudinal axis of the elongate element. The translational movement may be caused, for example, by radial expansion of an annular elongate element (such as a tube). Such radial expansion may result in local translational movement of the portion of the annular elongate element held by the clasp.

Configuring the apparatus such that the clasping portion can translate, for example to accommodate (local) translation of an elongate element that it is holding, without the need for any parts that allow relative rotation between parts of the clamp means that the clamp can be simple, inexpensive, and/or reliable (for example because there are fewer moving, such as rotating, parts that may fail, for example by seizure/breakage).

The second suspension position may be substantially opposite to the first suspension position. This may be the case, for example, in an embodiment having only two resilient arms. In general, the suspension positions may be evenly spaced around the outer collar, for example 120 degrees in an embodiment with three resilient arms. Additionally or alternatively, the first resilient arm and the second resilient arm may extend tangentially from the clasping portion. Such arrangements may be particularly convenient for allowing the clasping portion to translate without rotating. However, other arrangements may also be suitable.

The first resilient arm may extend to a first attachment position on the outer collar. The second resilient arm may extend to a second attachment position on the outer collar. The second attachment position may be substantially opposite to the first attachment position (for example in an embodiment having just two resilient arms). In general, the attachment positions may be evenly spaced around the outer collar, for example 120 degrees in an embodiment with three resilient arms. The first and/or second resilient arms may be rigidly attached to the outer collar. This may mean that the first and/or second resilient arms may not be rotatably attached to the outer collar. Any one or more of these features may be convenient for ensuring the desired translational movement of the clasping portion. For example, having the second attachment position substantially opposite to the first attachment position (or at least equal separation between the attachment portions) may help to ensure that two dimensional translation in perpendicular directions from an unbiased position of the clasping portion can be accommodated.

The first resilient arm and/or the second resilient arm may be attached tangentially to the outer collar. Similarly, the first resilient arm and/or the second resilient arm may extend tangentially from the clasping portion. Such an arrangement may result in a clasp that may be said to resemble a Catherine Wheel. Extending the arms tangentially from the clasping portion and/or the outer collar may help to reduce, or substantially eliminate, stress concentration between the arms and the clasping portion/outer collar.

The clamp may be arranged such that, in a cross-section normal to the clasping axis: the first resilient arm prescribes a curve extending from the first suspension position to the first attachment position; and the second resilient arm prescribes a curve extending from the second suspension position to the second attachment position. The curves prescribed by the first and second arms may be two-dimensional. For example the first and second arms may be substantially two-dimensional extrusions, the extrusion being along the clasping axis.

In such an arrangement, the curve prescribed by the first resilient arm may turn through an angle in the range of from 90° to 270°, for example 120° to 240°, for example 150° to 210°, for example on the order of 180° between the first suspension position to the first attachment position. The curve prescribed by the second resilient arm turns through an angle in the range of from 90° to 270°, for example 120° to 240°, for example 150° to 210°, for example on the order of 180° between the second suspension position to the second attachment position. Arranging the arms in this way may allow translational movement of the clasping portion to be accommodated without inducing unacceptable levels of stress in the clamp, for example in the flexible arms. In other embodiments, the curve prescribed by the first resilient arm and/or the curve prescribed by the second resilient arm may be less than 90° or greater than 270°.

The outer collar may comprise a non-planar, substantially rigid extrusion. The extrusion may extend in the direction of the clasping axis. The outer collar may extend around the outside of at least a portion of the clasp. As such, the clasp (including the clasping portion and the resilient arms) may be said to be at least partially within the outer collar. In this way, the outer collar may provide a solid and/or stiff structure, for example to support the weight of the elongate element (which may, for example, be an annular heating element for an anti-icing apparatus). Movement of the elongate element may then be contained within (for example not extend beyond) the outer collar. However, it will be appreciated that these advantages may also be provided by outer collars having other constructions. It will also be appreciated that, in this context, extrusion may refer to the final shape of the outer collar, and is not limited to being formed by an extrusion process. Indeed, any suitable manufacturing process could be used.

The outer collar may have a proximal end region and a distal end region. The proximal end region may be located close to, near to, or in the region of a proximal end of the outer collar. The distal end region may be located close to, near to, or in the region of a distal end of the outer collar. The terms proximal and distal may be with respect to a body, such as a wall or bracket, to which the outer collar may be fixed in use.

The first resilient arm may be attached to the outer collar at the distal end region. The second resilient arm may be attached to the outer collar at the proximal end region. The fixing portion may be provided at the proximal end region.

The clasp may comprise a first clasp element and a second clasp element. The first and second clasp elements may be separate before assembly of the clamp. The first clasp element may comprise the first resilient arm integrally formed with a first portion of the clasping portion. The second clasp element may have the second resilient arm integrally formed with a second portion of the clasping portion. When assembled, for example when in use, the first clamp element and the second clasp element may be releasably attached to each other, for example using any suitable fastener and/or fastening mechanism (which may, for example, be integral to the clasping portion or separate therefrom). The total number of clasp elements may be the same as the total number of resilient arms, with, for example, each clasp element comprising one resilient arm.

Such an arrangement with first and second clasp elements may be referred to as a modular clasp. This may be a particularly convenient way of configuring/assembling the clasp, for example because it may enable the elongate element (such as an annular heating pipe) to be readily installed in the clasping portion. It may also facilitate adjustment of the clasp during build, for example to reduce or substantially eliminate unwanted stress generation that may result from assembly/manufacture defects/misalignments. Additionally or alternatively, the clasping portion may be releasably attached to the outer collar. This may further increase the number of modular components. Having an at least partially modular clamp/clasp may be beneficial in facilitating the assembly, and/or in facilitating removal/replacement of parts during service, for example due to wear/damage to a particular component.

According to an aspect, there is provided an annular assembly comprising an annular element having an annular central axis. The annular assembly comprises at least one clamp as described above and elsewhere herein in relation to the present invention. The clamp or clamps may be used to mount the annular element to a fixed structure. The clasping portion of each clamp is configured to receive a circumferential portion, or segment, of the annular element. Radial expansion of the annular element can be accommodated by flexing of the first resilient arm and the second resilient arm. Radial expansion of the annular element may be accommodated by the clamps without relative rotation between the annular element and the respective clasping portions. Radial expansion of the annular element may be accommodated without rotation (about the clasping axis, which may be parallel to and/or collinear with the local central axis of the annular element) of either the annular element or the clasping portion.

The annular element may be an annular heating element. Radial expansion may be the result of a temperature rise of such an annular heating element, i.e. due to thermal expansion.

According to an aspect, there is provided an anti-icing assembly. The anti-icing assembly may be for a nacelle of a gas turbine engine. The anti-icing assembly may comprise an annular assembly as described above and elsewhere herein in relation to the present invention. In such an arrangement, the annular heating element may be configured to provide heat to the leading edge of the nacelle. The fixing portion of the outer collar of each clamp may be configured to fix the respective clamp to a fixed structure in the gas turbine engine, such as a bulkhead.

According to such an anti-icing assembly, any radial expansion of the annular heating element may be accommodated by translational movement of the clasping portion of the clamp. All of the advantages described herein, for example above, in relation to accommodation of translational motion of an elongate element by translational movement of the clasping portion apply in relation to radial expansion of the heating element being accommodated by the clasping portion(s), for example without relative rotation between each clasping portion and the annular heating element about the clasping axis. In this regard, the annular heating element may be the elongate element, and the local central axis of the annular heating element (i.e. the axis running through the centreline of the annular heating element) may be aligned with the clasping axis of a clamp that it is being held/supported by.

The annular heating element may be a pipe configured to receive fluid having a higher than ambient temperature. The pipe may have a plurality of bleed holes formed therein configured to allow, in use, fluid in the pipe to be emitted from the pipe for use in heating the nacelle. The plurality of bleed holes may form a circumferential array of fluid outlets. The fluid provided to the annular heating element may be a gas, such as air. The gas may be bled from another part of a gas turbine engine, for example from the exit of a compressor, for example prior to entry to a combustor.

A gas turbine engine comprising a clamp as described and claimed herein in relation to the invention (for example by way of including an anti-icing system including such a clamp) is within the scope of the invention.

BRIEF DESCRIPTION OF THE DRAWINGS

Embodiments of the invention will now be described by way of example only, with reference to the accompanying diagrammatic drawings, in which.

DETAILED DESCRIPTION OF THE PREFERRED EMBODIMENTS

Figure 3:
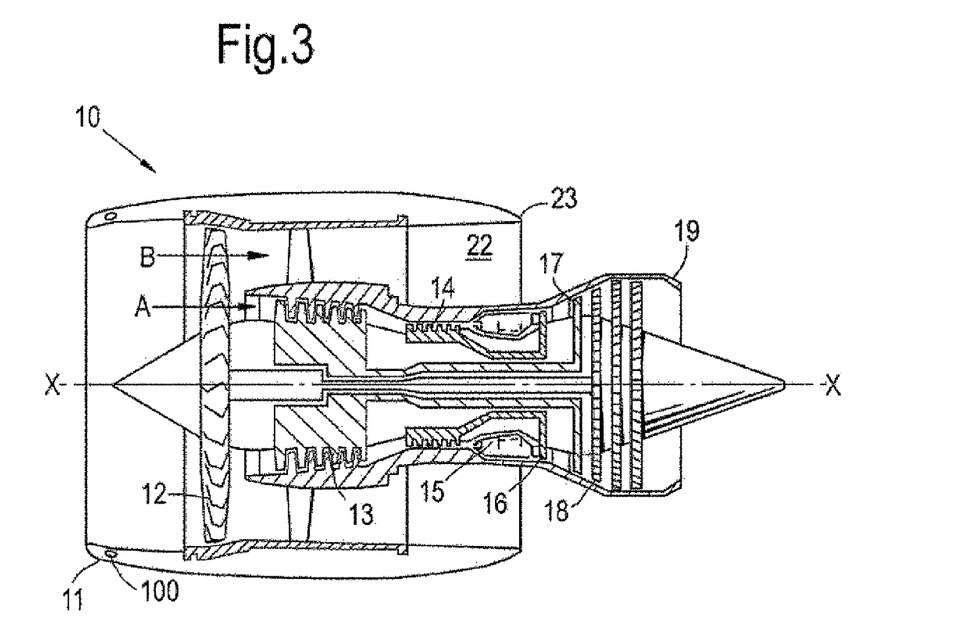
FIG. 3 is a cross-section through a gas turbine engine having a nacelle anti-icing system according to an embodiment of the present invention mounted therein.

With reference to FIG. 3, a ducted fan gas turbine engine generally indicated at 10 has a principal and rotational axis X-X. The engine 10 comprises, in axial flow series, an air intake (which may be referred to as a nacelle) 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. The ducted fan gas turbine engine 10 has a bypass duct 22 and a bypass exhaust nozzle 23.

The gas turbine engine 10 works in a conventional manner so that air entering through the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines 16, 17, 18 respectively drive the high and intermediate pressure compressors 14, 13 and the fan 12 by suitable interconnecting shafts.

The gas turbine engine 10 shown in FIG. 3 has at least one anti-icing system configured to prevent/reduce ice build-up on certain parts of the engine 10. One such anti-icing system 100 is provided within the surfaces defining the engine intake 11, that is to say within an upstream region of the nacelle 11. The anti-icing system 100 in the nacelle 11 may prevent/reduce the build-up of ice which, as described above, may tend to form in this region either on the ground or during flight in the absence of such an anti-icing system 100.

Figure 4:
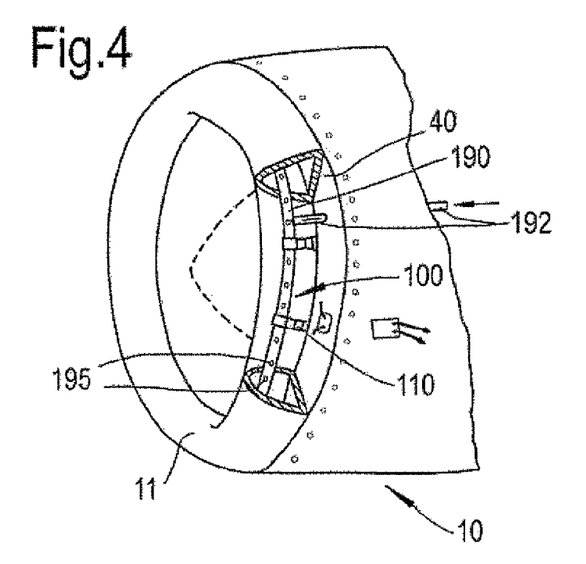
FIG. 4 is an enlarged view of an upstream portion of a gas turbine engine including a partially cut-away view of a nacelle having an anti-icing system according to an embodiment of the present invention mounted therein.

The anti-icing system 100 and the nacelle 11 is shown in greater detail in the FIG. 4 schematic. The anti-icing system 100 has a heating element 190 arranged to provide heat to the nacelle 11. The heating element 190 may be configured to provide heat to the regions of the nacelle 11 which are particularly susceptible to ice build-up and/or regions in which it is particularly critical to avoid ice build-up.

In the FIG. 4 arrangement, the heating element 190 is annular. This may mean that the centreline of the heating element 190 is annular about the engine axis X-X. The annular heating element 190 is provided with hot fluid (for example air at a temperature above ambient temperature) through a fluid supply tube 192. Hot air from the exit of the compressor 14 may be provided to the heating element 190 through the supply tube 192, although the hot fluid may be supplied from any suitable means. In the FIG. 4 arrangement, the heating element 190 has a series of exit holes 195. The exit holes 195 may form a circumferential ring. The exit holes 195 are configured to supply the hot air from inside the heating element 190 to the nacelle 11, for example to the internal surface(s) of the nacelle 11.

It will be appreciated that other types of heating element 190 could be used. For example, the heating element 190 may not have exit holes 195. The heating element 190 may not be provided with hot fluid at all. For example, the heating element 190 could be an electrical heating element.

The heating element 190 is mounted to the gas turbine engine 10, for example to a wall or bulkhead 40 near to the leading edge of the engine 10, within the air intake surfaces 11, using one or more clamps 110.

Figure 5:
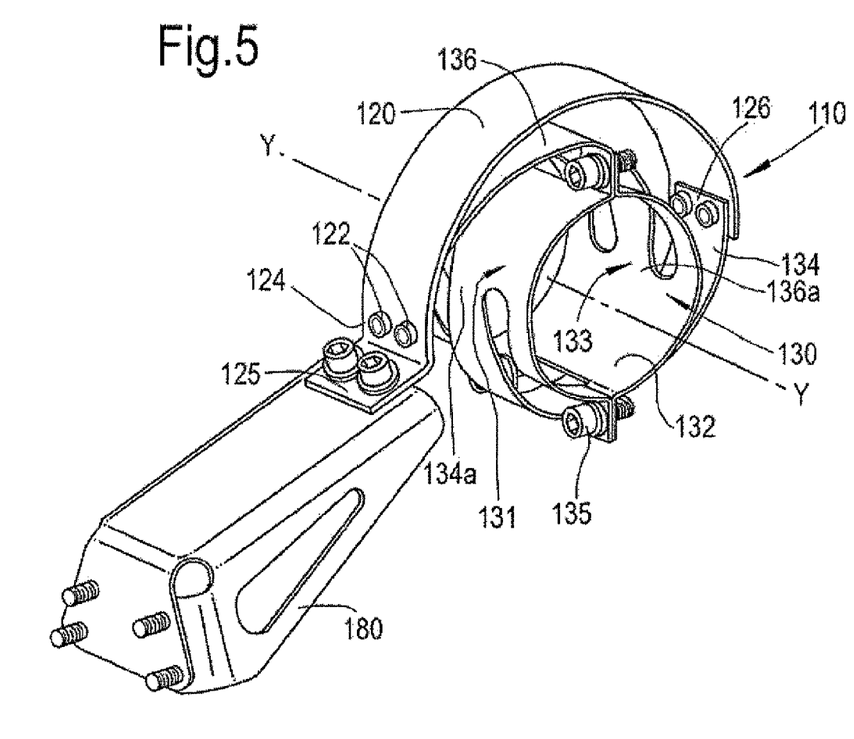
FIG. 5 is an isometric view of a mounting arrangement including a clamp according to an embodiment the present invention.

A clamp 110 is shown in greater detail in FIG. 5. The clamp has an outer collar 120 and a clasp 130. The clasp 130 comprises a clasping portion 132. The clasp comprises a first resilient arm 134 extending from a first suspension position 134a of the clasping portion 132, and a second resilient arm 136 extending from a second suspension position 136a of the clasping portion 132.

The outer collar 120 may be substantially rigid. The outer collar may, in use, experience substantially no deformation, i.e. it may be sufficiently stiff that it retains its shape during use, for example during normal use. It may be manufactured from any suitable material (such as a suitable metal (such as steel), plastic, composite, or other material), for example a material which enables it be stiff enough to retain its shape and/or strong enough to support the annular heating element 190 and the movements thereof. However, in some embodiments, the outer collar 120 may flex or distort to a certain extent. Indeed, even an outer collar 120 that is said to be substantially rigid may allow for a degree of flexing under load. The outer collar 120 may be said to be more rigid than the resilient arms 134, 136.

In the embodiment shown in FIG. 5, the outer collar 120 is shown as having a generally semi-circular shape or form. Thus, in a cross-section perpendicular to the clasping axis Y-Y (described in greater detail below), the outer collar 120 of FIG. 5 is semi-circular. In the FIG. 5 embodiment, the outer collar 120 partially surrounds the clasp 130. It will be appreciated that the outer collar 120 may take other shapes/forms than that shown in FIG. 5. For example, a cross-section perpendicular to the clasping axis Y-Y may take any suitable regular or irregular shape, and may be either a closed shape (such as a circle, triangle, square, pentagon, or hexagon, for example) or an open shape (such as any arcuate shape, including semi-circular as in the FIG. 5 example, or any other shape of line).

The clasping portion 132 of the clasp 130 is configured to clasp the annular heating element 190. The clasping portion 132 is configured to engage with a portion of the annular heating element 190 in order to clasp, clamp, hold, or support it. The clasping portion 132 has a clasping axis Y-Y. The clasping axis Y-Y extends along the centreline of the clasping portion 132. When assembled with the annular heating element 190, the clasping axis Y-Y would, in the FIG. 5 embodiment at least, be substantially co-linear with the (local) centreline axis of the annular heating element 190.

The clasping portion 132 is shown in the FIG. 5 embodiment as being of a generally cylindrical shape. As such, a cross-section through the clasping portion 132 perpendicular to the clasping axis Y-Y is generally circular (although some cross sections may have gaps in them, for example due to the construction of the first and second resilient arms 134, 136). In other embodiments, the clasping portion 132 may take other shapes/forms. For example, the cross-section through the clasping portion 132 perpendicular to the clasping axis Y-Y may have the same general shape as a cross-section in the same plane through the heating element 190 being clasped. For example, the cross-section through the clasping portion 132 perpendicular to the clasping axis Y-Y may be any regular or irregular shape, such as a circle, triangle, square, pentagon, or hexagon, for example.

In the FIG. 5 embodiment, the clasp 130 comprises a first clasp element 131 and a second clasp element 133. When assembled, the first clasp element 131 and the second clasp element 133 are connected together, for example releasably connected together. In the FIG. 5 embodiment, fixing elements 135 (such as, by way of example only, nuts, bolts, screws or rivets) are used to connect the first clasp element 131 and the second clasp element 133 together. However, other fastening mechanisms may be used, which may be integral to or separate from the clasp elements 131, 133.

Figure 6:
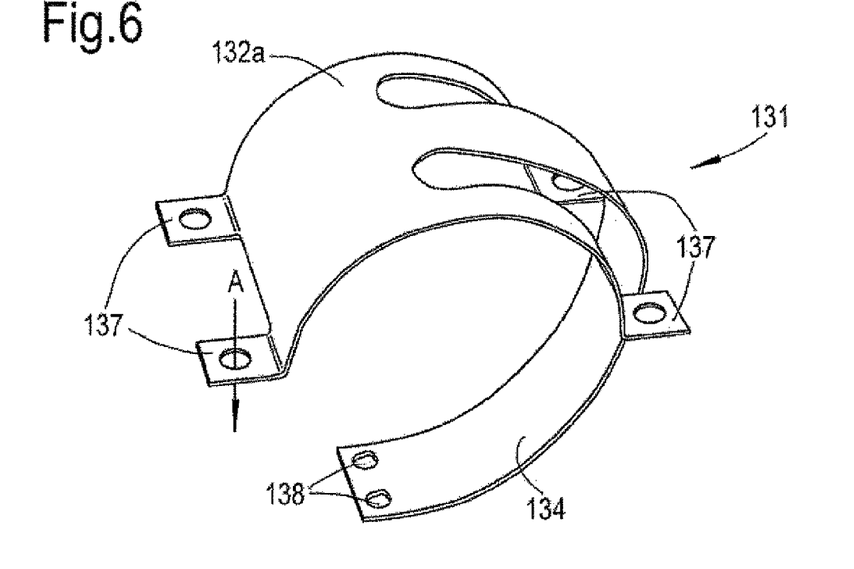
FIG. 6 is a first clasp element for use in an embodiment of the present invention.

In the FIG. 5 embodiment, the clasp elements 131, 133 are identical to each other, although this need not necessarily be the case. A more detailed view of a clasp element 131, 133 is shown in FIG. 6. Features of the first clasp element 131 are labelled in FIG. 6, but FIG. 6 may also be representative of the second clasp element 133. The first clasp element comprises the first resilient arm 134 and a first portion 132a of the clasping portion 132. The first clasp element 131 also has lugs 137 for connecting the first clasp element 131 and the second clasp element 133 together. The lugs 137 have holes through which fixing element 135 may pass (in the direction of arrow A, for example) in order to engage with corresponding lugs on the second resilient arm. Of course, other arrangements and/or numbers of lugs 137 may be provided.

The first clasp element 131 is provided with holes 138 at a distal end of the first resilient arm 134. The holes 138 may be used to attach (for example releasably attach) the first resilient arm 134 to the outer collar 120 at a first attachment position 124 (which may be at a proximal end portion 128 of the outer collar 120), for example using fastening elements 122, which may take any suitable form. In a similar way, the second resilient arm may be attached to a second attachment position 126 (which may be at a distal end portion 129) of the outer collar 120. Any suitable fastening mechanism may be used, which may or may not be integral to one or more of the outer collar 120 and the first (or second) resilient arm 134, 136. The connection between the first (or second) resilient arm 134, 136 and the outer collar 120 may be substantially rigid, for example such that no relative rotation between the resilient arm 134 and the outer collar 120 is possible.

An advantage of having (at least) two connectable elements (i.e. the first clasp element 131 and the second clasp element 133) forming the clasp 130 is that the clasp 130 can be modular. This may help with assembly, for example facilitating mounting/insertion of the element 190 into the clasping portion 132, and/or allowing for adjustment to take into account build/manufacture misalignment/defects. Such a modular system may also allow component parts (such as one or both of the first and second clasping elements 131, 133) to be replaced and/or removed as required. However, it will be appreciated that the modular construction may not be required. For example, in some embodiments, clasp 130 may be formed as a single part. Alternatively or additionally, the first and second resilient arms 134, 136 may be attached, for example releasably attached, to the clasping portion 132 during assembly. Indeed, any suitable construction of the clasp 130 may be used.

The first and second clasping elements 131, 133 may be formed using any suitable material (such as a suitable metal (such as steel), plastic, composite, or other material). The first and second resilient arms 134, 136 could be formed using the same material as the clasping portion 132. Alternatively, one or more of the resilient arms 134, 136 could be formed using a different material to the clasping portion 132. The resilient arms 134, 136 may be formed using an elastically deformable material. As explained herein, this may allow the resilient arms 134, 136 to reversibly deform to accommodate movement of the clasping portion 132, which movement may be caused by an element being clasped by the clasping portion 132.

Figure 7:
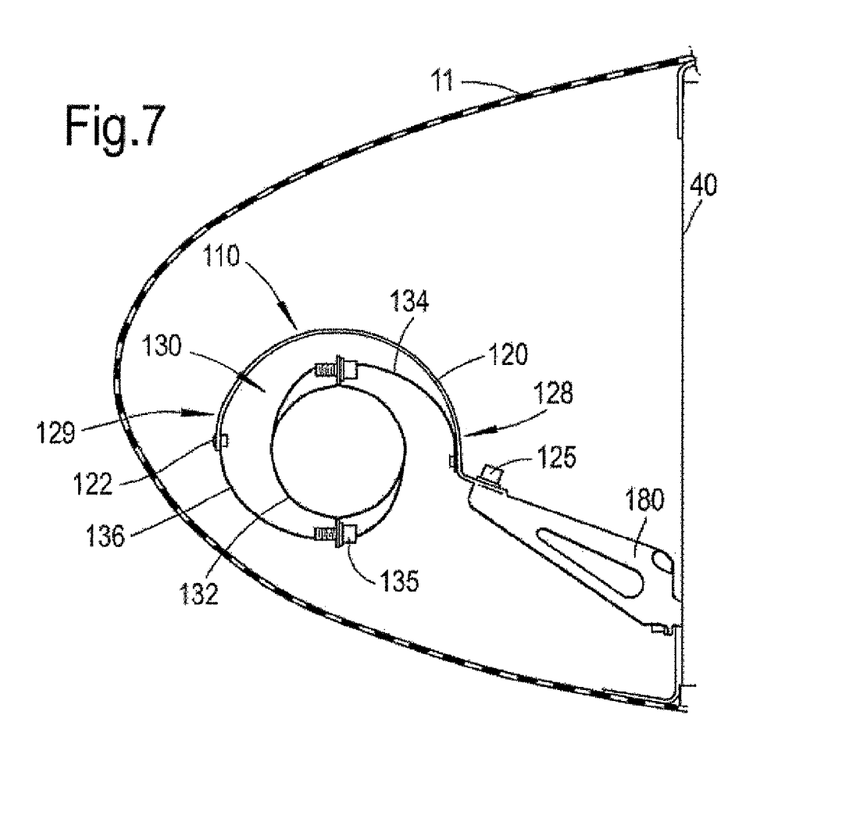
FIG. 7 is a cross-sectional view through a nacelle of a gas turbine engine, including a side view of a mounting arrangement including a clamp according to an embodiment of the present invention.

FIG. 7 shows, in side view, a clamp 110 mounted within a leading edge (or nacelle) 11 of a gas turbine engine intake. In the FIG. 7 arrangement, the clamp 110 is connected to the engine (in this example to a bulkhead 40 of the engine) through a fixing portion 125 of the outer collar 120 via a mounting bracket 180. The mounting bracket 180 may be strong and/or stiff so as to be able to support the clamp 110 and heating element 190 arrangement. The mounting bracket 180 may have a 3-dimensional shape, for example to give strength and stiffness in three perpendicular dimensions.

Some arrangements may not include a mounting bracket 180. For example, in some arrangements the outer collar 120 may be connected (in any suitable manner) directly to the gas turbine engine, for example to a bulkhead 40 in the gas turbine engine. Thus, the fixing portion 125 may fix (or attach/connect) the clamp 110 to a structure 40 either directly or indirectly.

In operation, motion, for example translation, of the clasping portion 132 may be accommodated by flexing, for example elastic flexing or deformation, of the first and second resilient arms 134, 136. The outer collar 120 may remain substantially rigid, i.e. without any substantial deformation, in response to movement of the clasp 130, for example movement of the clasping portion 132. All movement may be said to be contained within the outer collar.

Figure 8:
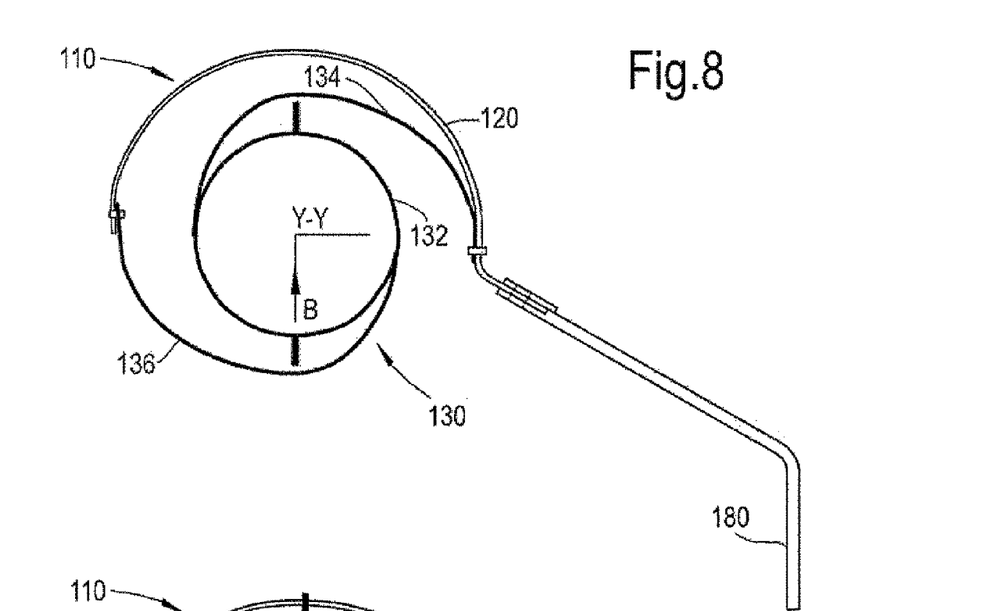
FIG. 8 is a side view of a mounting arrangement including a clamp according to an embodiment of the present invention in an undeformed state.
Figure 9:
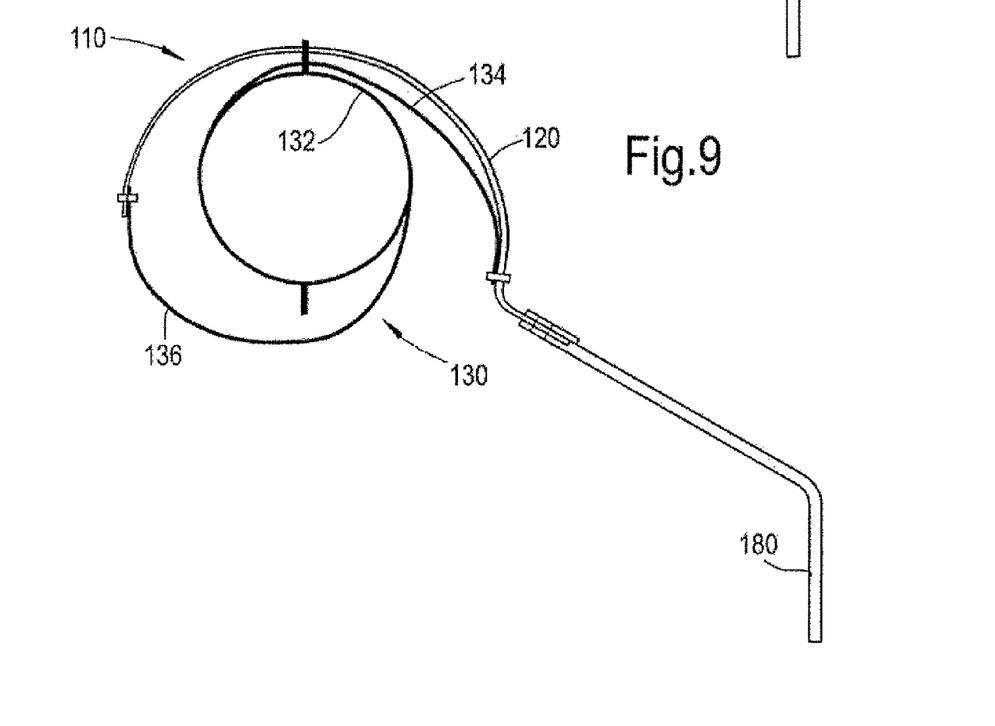
FIG. 9 is a side view of the mounting arrangement shown in FIG. 8 in which a clasping portion is shown in a deformed state.

An example of the response of the clamp 110 to movement of the clasping portion 132 is shown in FIGS. 8 and 9 which show schematic representations of a clamp 110. FIG. 8 illustrates a first position of the clasping portion 132 relative to the outer collar 120. FIG. 9 illustrates a second position of the clasping portion 132 relative to the outer collar 120. The first position (shown in FIG. 8) may represent an undeformed position of the clamp 110. Thus, the FIG. 8 arrangement may represent the clamp geometry when no external forces are applied. The second position (shown in FIG. 9) may represent a deformed position of the clamp 110. The second position may represent deformation of the clamp 110 in response to a force applied in the direction of arrow B shown in FIG. 8, i.e. the force in the direction of arrow B may deform the clamp from the geometry shown in FIG. 8 to the geometry shown in FIG. 9. This force direction B shown in FIG. 8 may be in the radial-axial plane relative to the engine axis X-X, for example in the radial direction relative to the engine axis X-X.

As shown in FIG. 9, in the deformed shape, the clasping portion 132 is translated in the direction of the applied force (arrow B). There is no rotation of the clasping portion 132 about the clasping axis Y-Y. Thus, the clasping portion 132 translates in response to the force in the direction of arrow B, but does not rotate.

The force provided to move the clasping portion 132 may be provided by an element, such as an elongate element, that is clasped by the clasping portion 132. Such an elongate element may be a heating element for an anti-icing system of a gas turbine engine, such as the annular heating element 190 for a leading edge intake anti-icing system. The force exerted on the clasping portion 132 from the annular heating element 190 may be generated by radial expansion of the heating element, for example relative to the engine axis X-X. Such radial expansion may be generated by, for example, increased temperature of the annular heating element 190 during use and/or increased pressure within the annular heating element 190 during use.

The clasping portion 132 may translate in the plane perpendicular to the clasping axis Y-Y. In some arrangements, the clasping portion 132 may translate in the direction of the force that is applied to it. This may be the case regardless of the direction in which the force is applied. For example, the clasping portion 132 may translate in the direction of any force that is applied to it in a plane perpendicular to the clasping axis Y-Y (which, in an example applied to a gas turbine engine, in particular to an anti-icing arrangement for a nacelle of a gas turbine engine, may correspond to the axial-radial plane relative to the engine axis X-X). Such translation of the clasping portion 132 may be enabled by the resilient arms 134, 136, in particular by flexing of the resilient arms 134, 136.

There may be no relative rotation between the clasping portion 132 and the element being clasped thereby. For example, translational movement of the element being clasped by the clasping portion 132 may result in no relative rotation between the clasping portion 132 and the element being clasped thereby. This may reduce/substantially eliminate any wear of the clasping portion 132 and/or the elongate element 190 that would otherwise result from friction caused by relative rotation. The elongate element 190 may be supported by the clasping portion 132 without being fixedly attached thereto. Alternatively, the clasping portion 132 and the elongate element 190 may be fixed together by any suitable means, for example by welding.

Figure 10:
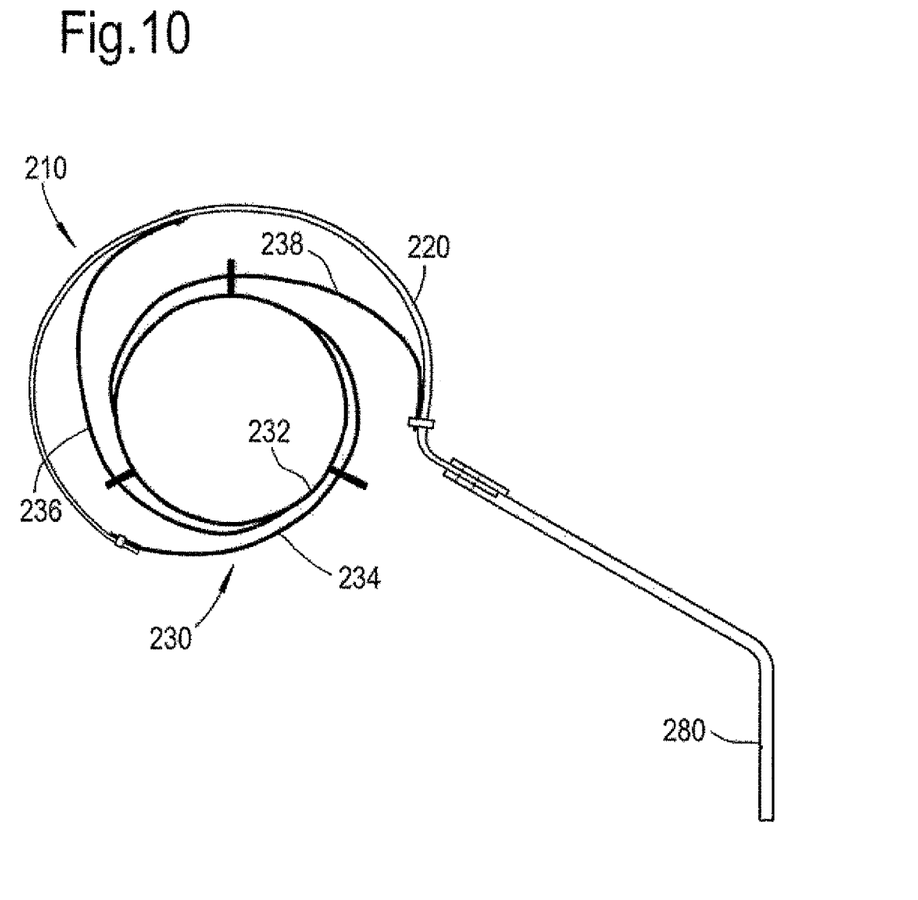
FIG. 10 is a side view of a mounting arrangement including a clamp according to another embodiment of the invention.

FIG. 10 shows another example of a clamp 210, with an optional mounting bracket 280. The clamp 210 has a clasp 230 that comprises three resilient arms 234, 236, 238. The clamp 210 of FIG. 10 has an outer collar 220 that extends through approximately 240 degrees. Each resilient arm 234, 236, 238 extends through approximately 225 degrees. Other constructions of clamp 210 having three resilient arms are also possible, for example with resilient arms extending through greater than or less than 225 degrees, and/or with an outer collar extending through more than or less than 240 degrees. In other functional and constructional aspects, the clamp 210 corresponds to the clamp 110 described above in relation to FIGS. 5-9. For example, a clasping portion 232 in the FIG. 10 arrangement may be formed by assembling three clasp elements together, each clasp element comprising one of the three resilient arms 234, 236, 238. It will be appreciated that any compatible feature described herein, for example in relation to the FIG. 5-9 arrangement(s), could be applied to the FIG. 10 arrangement, or indeed any other suitable clamp arrangement.

The description herein has focussed on movement in a plane that is perpendicular to the clasping axis Y-Y. Some embodiments may allow a degree of movement (for example translation and/or rotation) that is not normal to the clamping axis Y-Y. For example, the clasp 130 and/or the outer collar 120 may (or may not) move along the clamping axis Y-Y, for example if a force is provided in that direction. Additionally or alternatively, the clasp 130 and/or the outer collar 120 may (or may not) rotate about an axis that has a component that is not parallel to the clamping axis Y-Y, for example if a torque is provided about such other axis.

The clamp 110 could be used with any suitable application. For example, the clamp 110 could be used to support/clamp/hold any element, for example any elongate element. The clamp 110 may be useful in applications in which motion, for example translational motion, needs to be accommodated by the clamp 110, for example without rotation of the clamp 110. For example, one or more clamps 110 could be used with any heating elements, which may translate due to thermal expansion. As described herein, such a heating element may be an annular heating element, for example for use in an anti-icing system anywhere in a gas turbine engine.

It will be appreciated that many alternative configurations and/or arrangements of the clamp 110 and/or the anti-icing system 100 and components/parts thereof other than those described herein may fall within the scope of the invention. For example, alternative arrangements of clasping portion 130, resilient arms 134, 136, and/or components/parts thereof may fall within the scope of the invention and may be readily apparent to the skilled person from the disclosure provided herein. Furthermore, any feature described and/or claimed herein may be combined with any other compatible feature described in relation to the same or another embodiment.

We claim:

1. A clamp for holding an elongate element having a central axis, the clamp comprising:
    an outer collar having a fixing portion for fixing the clamp to a fixed structure; and
    a clasp for holding the elongate element, the clasp comprising:
        a clasping portion arranged to receive the elongate element such that, when the elongate element is received, a clasping axis (Y-Y axis) of the clasping portion is generally aligned with the central axis of the elongate element;
        a first resilient arm extending from a first suspension position of the clasping portion to the outer collar, the first resilient arm being offset from the clasping portion in the direction of the clasping axis at the first suspension position; and
        a second resilient arm extending from a second suspension position of the clasping portion to the outer collar,
    wherein the first and second resilient arms allow translational movement of the clasping portion in a plane perpendicular to the clasping axis by flexing of the first resilient arm and of the second resilient arm.

2. The clamp according to claim 1, wherein the first resilient arm and the second resilient arm are arranged between the clasping portion and the outer collar so as to allow translational movement of the clasping portion with substantially no rotation of the clasping portion about the clasping axis.

3. The clamp according to claim 1, wherein the second suspension position is substantially opposite to the first suspension position.

4. The clamp according to claim 1, wherein the first resilient arm and the second resilient arm extend tangentially from the clasping portion.

5. The clamp according to claim 1, wherein:
    the first resilient arm extends to a first attachment position on the outer collar;
    the second resilient arm extends to a second attachment position on the outer collar; and
    the second attachment position is substantially opposite to the first attachment position.

6. The clamp according to claim 1, wherein the first resilient arm and the second resilient arm are attached tangentially to the outer collar.

7. The clamp according to claim 1, wherein, in a cross-section perpendicular to the clasping axis:
    the first resilient arm forms a curve extending from the first suspension position to a first attachment position on the outer collar; and
    the second resilient arm forms a curve extending from the second suspension position to a second attachment position on the outer collar.

8. The clamp according to claim 7, wherein:
    the curve of the first resilient arm turns through an angle in the range of from 120° to 240° between the first suspension position to the first attachment position; and
    the curve of the second resilient arm turns through an angle in the range of from 120° to 240° between the second suspension position to the second attachment position.

9. The clamp according to claim 1, wherein:
    the outer collar comprises a non-planar, substantially rigid extrusion extending in the direction of the clasping axis; and
    the outer collar extends around the outside of at least a portion of the clasp.

10. The clamp according to claim 1, wherein:
    the outer collar has a proximal end region and a distal end region;
    the first resilient arm is attached to the outer collar at the distal end region;
    the second resilient arm is attached to the outer collar at the proximal end region; and
    the fixing portion is provided at the proximal end region.

11. The clamp according to claim 1, wherein:
the clasp comprises a first clasp element and a second clasp element, the first clasp element including the first resilient arm integrally formed with a first portion of the clasping portion, and the second clasp element including the second resilient arm integrally formed with a second portion of the clasping portion; and
the first clamp element and the second clasp element are releasably attached to each other.

12. The clamp according to claim 1, wherein the second resilient arm is offset from the clasping portion in the direction of the clasping axis at the second suspension position.

13. An annular assembly comprising:
an annular element having an annular central axis; and
a plurality of clamps configured to mount the annular element to a fixed structure, each clamp of the plurality of clamps including:
an outer collar having a fixing portion for fixing the clamp to the fixed structure; and
a clasp for holding the annular element, the clasp comprising:
a clasping portion arranged to receive the annular element such that, when the annular element is received, a clasping axis (Y-Y axis) of the clasping portion is generally aligned with the central axis of the annular element;
a first resilient arm extending from a first suspension position of the clasping portion to the outer collar, the first resilient arm being offset from the clasping portion in the direction of the clasping axis at the first suspension position; and
a second resilient arm extending from a second suspension position of the clasping portion to the outer collar,
wherein:
the first and second resilient arms allow translational movement of the clasping portion in a plane perpendicular to the clasping axis by flexing of the first resilient arm and of the second resilient arm, and
the clasping portion of each clamp is configured to receive a circumferential portion of the annular element, much that radial expansion of the annular element is accommodated by the clamps.

14. The annular assembly according to claim 13, wherein radial expansion of the annular element is accommodated by the clamps without relative rotation between the annular element and the respective clasping portions.

15. An anti-icing assembly for a nacelle of a gas turbine engine, the anti-icing assembly comprising:
an annular element having an annular central axis; and
a plurality of clamp configured to mount the annular element to a fixed structure, each clamp of the plurality of clamps including:
an outer collar having a fixing portion for fixing the clamp to the fixed structure; and
a clasp for holding the annular element, the clasp comprising:
a clasping portion arranged to receive the annular element such that, when the annular element is received, a clasping axis (Y-Y axis) of the clasping portion is generally aligned with the central axis of the annular element;
a first resilient arm extending from a first suspension position of the clasping portion to the outer collar, the first resilient arm being offset from the clasping portion in the direction of the clasping axis at the first suspension position; and
a second resilient arm extending from a second suspension position of the clasping portion to the outer collar,
wherein:
the first and second resilient arms allow translational movement of the clasping portion in a plane perpendicular to the clasping axis by flexing of the first resilient arm and of the second resilient arm,
the clasping portion of each clamp is configured to receive a circumferential portion of the annular element, such that radial expansion of the annular element is accommodated by the clamps,
the annular element is an annular heating element configured to provide heat to a leading edge of the nacelle, and
the fixing portion of the outer collar of each clamp is configured to fix the respective clamp to the fixed structure.

16. The anti-icing assembly according to claim 15, wherein:
the annular heating element is a pipe configured to receive fluid having a higher temperature than ambient temperature, and
the pipe has a plurality of bleed holes that are configured to allow fluid in the pipe to be emitted from the pipe for use in heating the nacelle.

* * * * *